(12) United States Patent
Maleki et al.

(10) Patent No.: US 12,075,359 B2
(45) Date of Patent: Aug. 27, 2024

(54) ENHANCED PAGING OCCASION (PO) MONITORING FOR NEW RADIO (NR) USER EQUIPMENT (UE) POWER SAVINGS IN RRC_IDLE/INACTIVE

(71) Applicant: TELEFONAKTIEBOLAGET L M ERICSSON (PUBL), Stockholm (SE)

(72) Inventors: Sina Maleki, Malmö (SE); Ali Nader, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 17/599,511

(22) PCT Filed: Mar. 20, 2020

(86) PCT No.: PCT/IB2020/052640
§ 371 (c)(1),
(2) Date: Sep. 28, 2021

(87) PCT Pub. No.: WO2020/201885
PCT Pub. Date: Oct. 8, 2020

(65) Prior Publication Data
US 2022/0174603 A1      Jun. 2, 2022

Related U.S. Application Data

(60) Provisional application No. 62/827,761, filed on Apr. 1, 2019.

(51) Int. Cl.
*H04B 7/185*     (2006.01)
*H04W 52/02*    (2009.01)
*H04W 68/00*    (2009.01)

(52) U.S. Cl.
CPC ... *H04W 52/0235* (2013.01); *H04W 52/0216* (2013.01); *H04W 68/005* (2013.01)

(58) Field of Classification Search
CPC ......... H04W 52/0235; H04W 52/0216; H04W 68/005
(Continued)

(56) References Cited

U.S. PATENT DOCUMENTS

2020/0029302 A1*  1/2020  Cox .................. H04W 52/0216
2020/0053781 A1*  2/2020  Pan ...................... H04W 72/30
(Continued)

FOREIGN PATENT DOCUMENTS

CN          1949920 A        4/2007
CN        101897224 A       11/2010
(Continued)

OTHER PUBLICATIONS

Nokia et al: "Paging in NR", 3GPP Draft; R1-1800806, 3rd Generation Partnership Project (3GPP), Mobile Competence Centre ; 650, Route Des Lucioles ; F-06921 Sophia-Antipolis Cedex; France, Jan. 22-26, 2018.
(Continued)

*Primary Examiner* — Temica M Beamer

(57) ABSTRACT

A method performed by a wireless device in a wireless communication network for reducing paging occasion monitoring power consumption. The method includes receiving a paging indication from a base station, transitioning to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication, determining, while in the sleep mode, whether
(Continued)

the wireless device is to receive a paging message corresponding to the paging indication, and staying in the sleep mode or transitioning into a deeper sleep mode in response to a determination that the wireless device does not need to receive the paging message corresponding to the paging indication.

25 Claims, 11 Drawing Sheets

(58) Field of Classification Search
USPC .......................................................... 370/318
See application file for complete search history.

(56) References Cited

U.S. PATENT DOCUMENTS

| | | | | |
|---|---|---|---|---|
| 2020/0100179 | A1* | 3/2020 | Zhou | H04W 52/0216 |
| 2020/0163048 | A1* | 5/2020 | Kim | H04W 72/12 |
| 2020/0229095 | A1* | 7/2020 | Shrestha | H04W 4/70 |

FOREIGN PATENT DOCUMENTS

| | | |
|---|---|---|
| CN | 101641992 B | 12/2012 |
| CN | 103209466 A | 7/2013 |
| CN | 102281614 B | 12/2015 |
| CN | 103748804 B | 2/2017 |
| CN | 108024319 A | 5/2018 |
| DE | 112012007166 T5 | 8/2015 |
| JP | 2014527319 A | 10/2014 |
| KR | 20100091091 A | 8/2010 |
| RU | 2570895 C2 | 12/2015 |
| WO | 2009/054673 A2 | 4/2009 |

OTHER PUBLICATIONS

"3rd Generation Partnership Project; Technical Specification Group Radio Access Network; NR; Study on UE Power Saving (Release 16)", 3GPP Draft; R2-1903118_ TR38.840V100, 3rd Generation Partnership Project (3GPP), Mobile Competence, Mar. 29, 2019.

Mediatek Inc: "Discussion on paging design for UE power saving", 3GPP Draft; R1-1702716 Discussion On Paging Design for UE Power Saving Final, 3rd Generation Partnership Project (3GPP), Mobile Competence Centre ; 650, Route Des Lucioles; F-06921 Sophia Antipolis C, Feb. 13-17, 2017.

Ericsson: "Summary of 7.1.3.31 (resource allocation)", 3GPP Draft; R1-1807622 Summary Of 7.1.3.3.1 (Resource Allocation), 3rd Generation Partnership Project (3GPP), Mobile Competence Centre ; 650, Route Des Lucioles; F-06921 Sophia-Antipolis Cedex; Fran, May 21-25, 2018.

Ericsson: "Cross-slot scheduling for group paging", 3GPP Draft; R1-1905473 Cross-Slot Scheduling for Group Paging, 3rd Generation Partnership Project (3GPP), Mobile Competence Centre ; 650, Route Des Lucioles ; F-06921 Sophia-Antipolis Cedex ; France, Apr. 8-12, 2019.

3GPP Ts 38.211 V15.4.0 (2018-12), "3rd Generation Partnership Project; Technical Specification Group Radio Access Network; NR; Physical channels and modulation (Release 15)".

\* cited by examiner

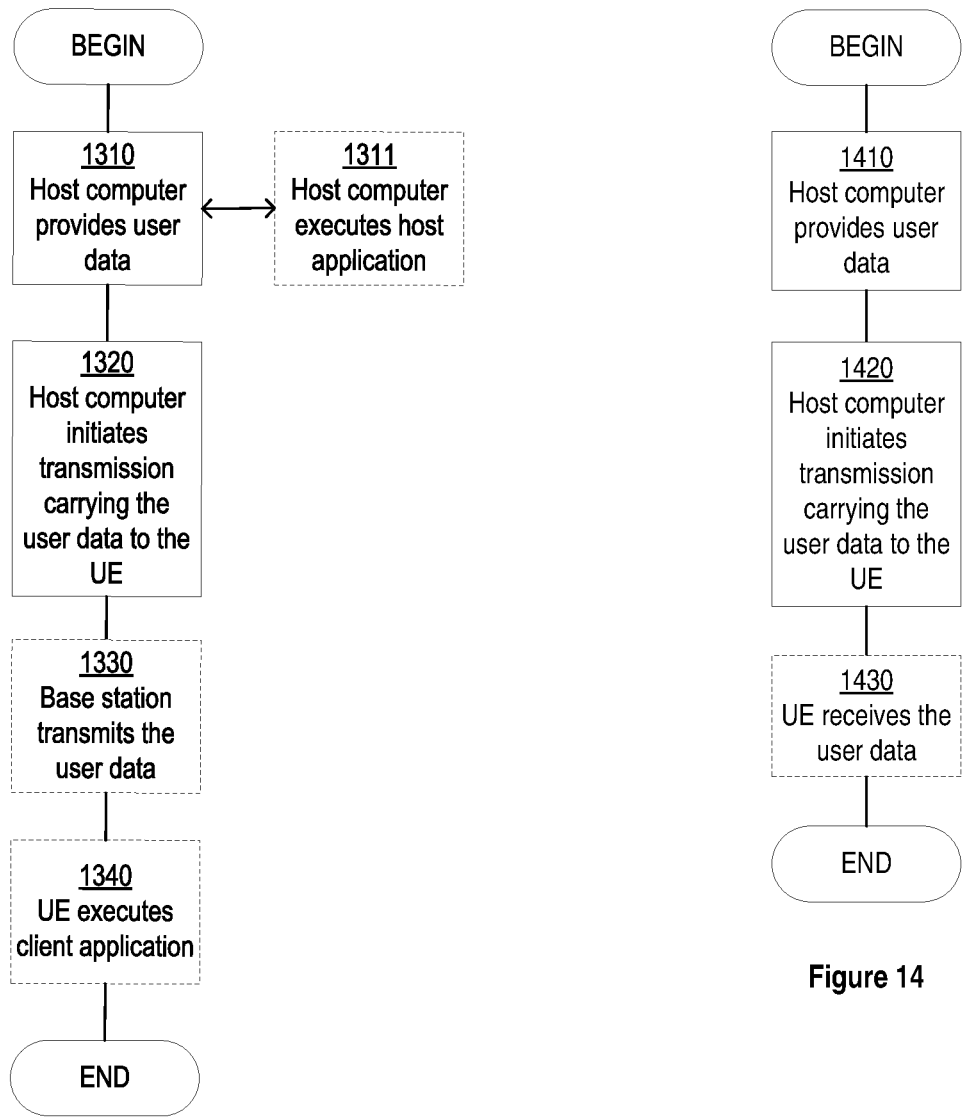

ENHANCED PAGING OCCASION (PO) MONITORING FOR NEW RADIO (NR) USER EQUIPMENT (UE) POWER SAVINGS IN RRC_IDLE/INACTIVE

CROSS-REFERENCE TO RELATED APPLICATIONS

This application is a 371 of International Application No. PCT/IB2020/052640, filed Mar. 20, 2020, which claims the benefit of U.S. Provisional Application No. 62/827,761, filed Apr. 1, 2019, the disclosures of which are fully incorporated herein by reference.

TECHNICAL FIELD

Embodiments of the invention relate to the field of wireless communication networks, and more specifically, to reducing paging occasion monitoring power consumption in wireless communication networks.

BACKGROUND

Paging is the mechanism with which the network tells a user equipment (UE) "I have something for you." Then the UE decodes the contents (e.g., paging cause) of the paging message (e.g., received on Physical Downlink Shared Channel (PDSCH)) and the UE initiates the appropriate procedure.

In most cases, the paging process happens while the UE is in idle mode. This means that the UE has to expend spend some energy (e.g., battery power) to run a "monitoring" process to monitor whether the network is sending any paging messages to it.

The paging procedure in Long Term Evolution (LTE) (and possibly in New Radio (NR)) is such that the UE checks for a paging indication (e.g., reception of Physical Downlink Control Channel (PDCCH) where cyclic redundancy check (CRC) is scrambled with paging radio network temporary identifier (P-RNTI)) in each paging occasion (PO) (referred to as PO monitoring), and if the paging indication with P-RNTI is received and indicates that there is a paging message, then the UE decodes the corresponding paging message (e.g., on PDSCH) to see if its unique identifier (ID) (e.g., inactive RNTI (I-RNTI) or 5G SAE-Temporary Mobile Subscriber Identity (5G-S-TMSI)) is included in the list or not.

The NR standard (e.g., for 5G) in the Third Generation Partnership Project (3GPP) is being designed to provide service for multiple use cases such as enhanced mobile broadband (eMBB), ultra-reliable and low latency communication (URLLC), and machine type communication (MTC). Each of these types of services may have different technical requirements. For example, the general requirement for eMBB is high data rate with moderate latency and moderate coverage, while the general requirement for URLLC is low latency and high reliability transmission for moderate data rates.

One of the solutions for implementing low latency data transmission is the use of shorter transmission time intervals. In addition to transmission in a slot, a mini-slot transmission is also allowed in NR to reduce latency. A mini-slot may consist of any number of 1 to 14 orthogonal frequency-division multiplexing (OFDM) symbols. The concepts of slot and mini-slot are not specific to a specific type of service, and as such a mini-slot may be used for either eMBB, URLLC, or other types of services.

UE power consumption is an important metric. In general, a relatively significant amount of power can be consumed on monitoring the PDCCH in Long Term Evolution (LTE) based on the discontinuous reception (DRX) setting from LTE field logs. The situation can be similar in NR if similar DRX setting with traffic modelling is utilized, as the UE needs to perform blind detection in its configured Control Resource Sets (CORESETs) to identify whether there is data on PDCCH sent to it, and act accordingly.

SUMMARY

A method performed by a wireless device in a wireless communication network for reducing paging occasion monitoring power consumption. The method includes receiving a paging indication from a base station, transitioning to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication, determining, while in the sleep mode, whether the wireless device is to receive a paging message corresponding to the paging indication, and staying in the sleep mode or transitioning into a deeper sleep mode in response to a determination that the wireless device does not need to receive the paging message corresponding to the paging indication.

A method performed by a first base station in a wireless communication network for reducing paging occasion monitoring power consumption. The method includes transmitting a paging indication to a set of wireless devices and transmitting a paging message corresponding to the paging indication at least with a guaranteed minimum length of delay after transmitting the paging indication, where at least one wireless device from the set of wireless devices is aware, prior to the at least one wireless device decoding the paging indication, that the base station is to transmit the paging message corresponding to the paging indication with at least the guaranteed minimum length of delay after the first base stations transmits the paging indication, where awareness of the guaranteed minimum length of delay allows the at least one wireless device to transition to a sleep mode after receiving the paging indication and before the at least one wireless device decodes the paging indication.

A wireless device for providing reduced paging occasion monitoring power consumption in a wireless communication network. The wireless device includes an antenna configured to transmit and receive wireless signals and processing circuitry coupled to the antenna, where the processing circuitry is configured to cause the wireless device to receive, via the antenna, a paging indication from a base station, transition to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication, determine, while in the sleep mode, whether the wireless device is to receive a paging message corresponding to the paging indication, and stay in the sleep mode or transition into a deeper sleep mode in response to a determination that the wireless device does not need to receive the paging message corresponding to the paging indication.

A network device to function as a first base station in a wireless communication network to provide reduced paging occasion monitoring power consumption in the wireless communication network. The network device includes an antenna configured to transmit and receive wireless signals and processing circuitry coupled to the antenna, where the processing circuitry is configured to cause the network device functioning as the first base station to transmit, via the antenna, a paging indication to a set of wireless devices and transmit, via the antenna, a paging message corresponding to the paging indication at least with a guaranteed minimum length of delay after transmitting the paging indication, where at least one wireless device from the set of wireless devices is aware, prior to the at least one wireless device decoding the paging indication, that the first base station is to transmit the paging message corresponding to the paging indication with at least the guaranteed minimum length of delay after the base stations transmits the paging indication, where awareness of the guaranteed minimum length of delay allows the at least one wireless device to transition to a sleep mode after receiving the paging indication and before the at least one wireless device decodes the paging indication.

BRIEF DESCRIPTION OF THE DRAWINGS

The invention may best be understood by referring to the following description and accompanying drawings that are used to illustrate embodiments of the invention. In the drawings:

FIG. 13 is a flow diagram of methods implemented in a communication system including a host computer, a base station and a user equipment, according to some embodiments.

FIG. 14 is a flow diagram of methods implemented in a communication system including a host computer, a base station and a user equipment, according to some embodiments.

FIG. 16 is a flow diagram of methods implemented in a communication system including a host computer, a base station and a user equipment, according to some embodiments.

DETAILED DESCRIPTION

Figure 1:
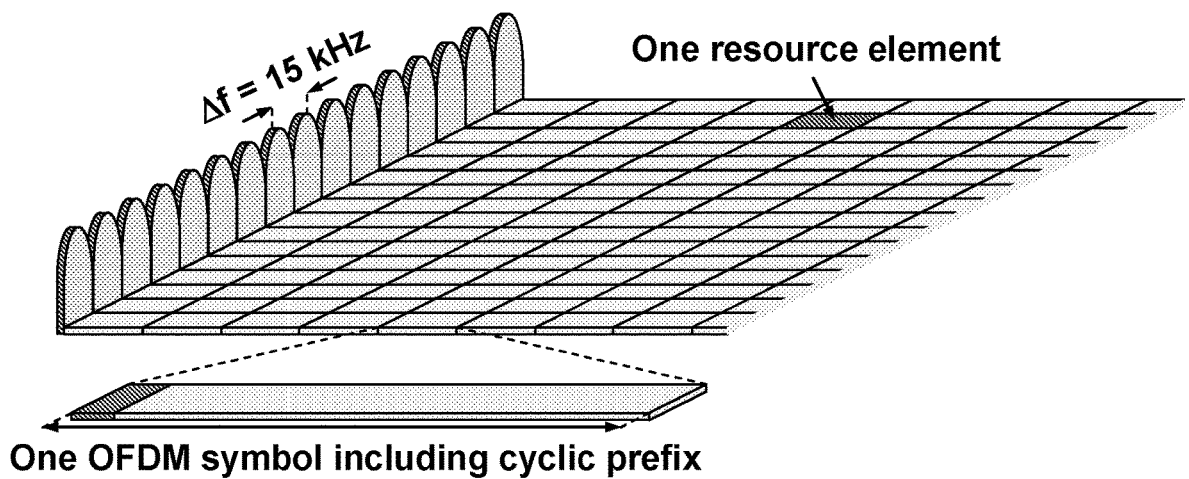
FIG. 1 is a diagram illustrating a radio resource in New Radio (NR).

The following description describes methods and apparatus for reducing paging occasion (PO) monitoring power consumption. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

FIG. 1 is a diagram illustrating a radio resource in NR. In release 15 (Rel-15) NR, a UE can be configured with up to four carrier bandwidth parts (BWPs) in the downlink with a single downlink carrier bandwidth part being active at a given time. Also, a UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWH}^{size}-1$, where i is the index of the carrier bandwidth part. A resource block (RB) is defined as 12 consecutive subcarriers in the frequency domain.

Numerologies

Multiple OFDM numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH PDSCH is the main physical channel used for unicast downlink data transmission, but also for transmission of random access response (RAR), certain system information blocks, and paging information. PBCH is used for transmitting the basic system information required by the UE to access the network. PDCCH is used for transmitting downlink control information (DCI) such as scheduling decisions required for reception of PDSCH and uplink scheduling grants enabling transmission on physical uplink shared channel (PUSCH).

An uplink physical channel corresponds to a set of resource elements carrying information originating from higher layers. The following uplink physical channels are defined:
  Physical Uplink Shared Channel, PUSCH
  Physical Uplink Control Channel, PUCCH
  Physical Random Access Channel, PRACH
  PUSCH is the uplink counterpart to PDSCH. PUCCH is used by UEs to transmit uplink control information, including hybrid automatic repeat request (HARQ) acknowledgements, channel state information reports, etc. PRACH is used for random access preamble transmission.

Example contents of a DL DCI 1_0 with CRC scrambled by cell RNTI (C-RNTI)/configured scheduling RNTI (CS-RNTI) is shown below.
  Identifier for DCI formats—1 bits
    The value of this bit field is set to 1, indicating a DL DCI format
  Frequency domain resource assignment—

Figure 2:
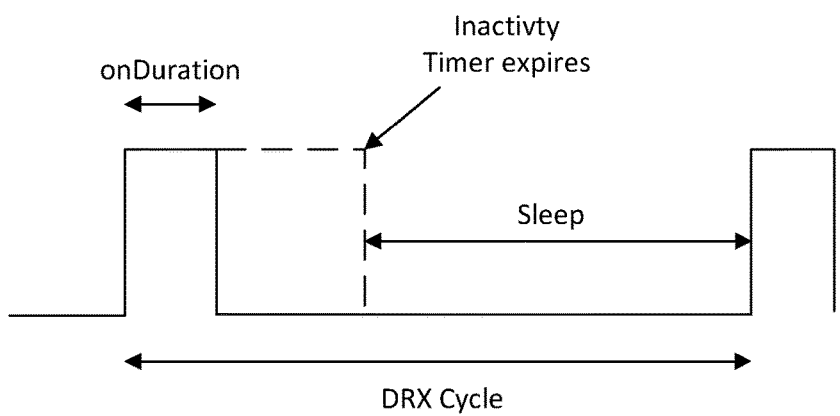
FIG. 2 is a diagram illustrating a simplified discontinuous reception (DRX) operation.

$\lceil \log_2(N_{RB}^{DL,BWP}(N_{RB}^{DL,BWP}+1)/2 \rceil$ bits $N_{RB}^{DL,BWP}$ is the size of the active DL bandwidth part in case DCI format 1_0 is monitored in the UE specific search space and satisfying
      the total number of different DCI sizes configured to monitor is no more than 4 for the cell, and
      the total number of different DCI sizes with C-RNTI configured to monitor is no more than 3 for the cell
    otherwise, $N_{RB}^{DL,BWP}$ is the size of configured control resource set (CORESET) 0.
  Time domain resource assignment—4 bits as defined in Subclause 5.1.2.1 of Technical Specification (TS) 38.214
  Virtual resource block-to-physical resource block (VRB-to-PRB) mapping—1 bit according to Table 7.3.1.1.2-33
  Modulation and coding scheme—5 bits as defined in Subclause 5.1.3 of TS 38.214
  New data indicator—1 bit
  Redundancy version—2 bits as defined in Table 7.3.1.1.1-2 of TS 38.212
  HARQ process number—4 bits
  Downlink assignment index—2 bits as defined in Subclause 9.1.3 of TS 38.213, as counter DAI
  Transmit power control (TPC) command for scheduled PUCCH—2 bits as defined in Subclause 7.2.1 of TS 38.213
  PUCCH resource indicator—3 bits as defined in Subclause 9.2.3 of TS 38.213
  PDSCH-to-HARQ_feedback timing indicator—3 bits as defined in Subclause 9.2.3 of TS 38.213
DRX FIG. 2 is a diagram illustrating a simplified DRX (discontinuous reception) operation. As shown, DRX allows a UE to transition to a lower power state (e.g., a sleep state) when it is not required to receive any transmission from the base station. There is an "onDuration" during which the UE is awake and monitors the control channels, and if there is a control message detected by the UE on the control channels, an inactivity timer begins, and the UE continues to monitor the control channel until a valid control message addressed to the UE is received or the inactivity timer expires. If the UE receives a valid control message, it extends the inactivity timer and continues to monitor the PDCCH. If the inactivity timer expires then the UE can stop receiving transmissions from the base station (e.g., no control channel monitoring) until the end of the DRX cycle. Typically, the DRX parameters are configured by radio resource control (RRC) and there are some other DRX parameters such as round trip time (RTT) related and hybrid automatic repeat request (HARQ) related parameters. The time during the onDuration and the time during which the inactivity timer is running is also referred to as active time.

The following terms are typically associated with DRX operation:
  Active Time: Time related to DRX operation, during which the media access control (MAC) entity monitors the PDCCH.
  DRX Cycle: Specifies the periodic repetition of the onDuration followed by a possible period of inactivity (see FIG. 2).
  Inactivity Timer: Generally, refers to the number of consecutive PDCCH-subframe(s)/slots after the subframe/slot in which a PDCCH indicates an initial UL, DL or SL user data transmission for a MAC entity.
  MAC entity is the medium access control entity, and there is one MAC entity per configured cell group, for example the master cell group and secondary cell group.

DRX functionality is typically configured by RRC, which typically operates on a slower scale than MAC or Physical layer. Thus, it is impractical for the DRX parameter settings to be dynamically changed through RRC configuration to match the traffic characteristics, particularly if the UE has a mix of traffic types.

There currently exist certain challenge(s). Paging occasion (PO) monitoring accounts for a significant part of the UE power consumption, particularly in RRC_Idle/Inactive modes. The UEs are configured with the same Paging-Radio Network Temporary Identifier (P-RNTI) and typically need to wake up to monitor PO after every inactivity-DRX (I-DRX) cycle. If a PDCCH with P-RNTI is transmitted and detected, the UEs monitoring the PO then each need to decode the corresponding paging message on PDSCH in order to determine if it is being paged. In cases where some other UE is being paged but the UE of interest is not being paged, it is a false alarm and the UE of interest ends up wasting power to receive and decode the paging message on PDSCH.

A Group P-RNTI (GP-RNTI) approach (which is being proposed in 3GPP) involves configuring different sets of one or more UEs with different GP-RNTIs, and the network includes in the paging indications on PDCCH the appropriate one of the GP-RNTIs for the set of UEs that it is paging. This requires that each of the UEs decode each of the paging indications on PDCCH to determine if the UE's GP-RNTI matches that of the paging indications. The UEs need to decode those of the paging messages on PDSCH corresponding to the paging indications on PDCCH that match their GP-RNTI. While the GP-RNTI approach may help reduce the number of paging messages the UE decodes, it does not fully solve the power consumption issues as the "k0" value indicating the distance between the paging indication on PDCCH and the corresponding paging message on PDSCH is not known, and thus the UE has to remain awake until the paging indication on PDCCH is decoded and the UE can establish that it is not in the group which is being paged (that is, until the UE determines that its assigned GP-RNTI does not match that of the paging indication on PDCCH). As such, the UE has to remain awake for the duration of the time required to receive the paging message on PDSCH while PDCCH is being decoded to make sure the UE receives the paging message in case it is being paged (that is, the UE has to remain awake and receive the paging message on PDSCH since the UE does not know whether it will have been able to receive/decode the paging indicator on PDCCH and determine whether there is a GP-RNTI match before the corresponding paging message is transmitted on PDSCH (particularly if the k0 value ends up being 0)).

Therefore, although the GP-RNTI approach leads to fewer false alarms (that is, times when the UE decodes the paging message on PDSCH), it does not fully solve the energy consumption problem discussed above.

Certain aspects of the present disclosure and their embodiments may provide solutions to these and/or other challenges. Embodiments reduce UE power consumption by applying one or more power consumption reduction techniques to PO monitoring based on provisioning a guaranteed minimum length of delay between the time a paging indication is transmitted and the time the corresponding paging message is transmitted. This guaranteed minimum length of delay allows a capable UE to transition to a sleep mode (e.g. microsleep or other type of low-power mode) after receiving the paging indication. The UE may then decode the paging indication and determine whether it needs to receive/decode a corresponding paging message (e.g., based on matching the UE's P-RNTI or GP-RNTI against that of the paging indication). If the UE determines that it needs to receive/decode the corresponding paging message, then the UE may transition to an awake mode to receive the paging message. Otherwise, if the UE determines that it does not need to receive/decode the corresponding paging message, then the UE may stay in the current sleep mode or transition to an even deeper sleep mode. This is in contrast to existing PO monitoring mechanisms where the UE needs to stay awake after receiving the paging indication on PDCCH (e.g., in case there is a corresponding paging message transmitted on PDSCH without delay or with very short delay (e.g., if k0 value ends up being 0)). Staying awake may involve collecting received signal samples for later PDSCH detection and decoding processing. Further, in some embodiments, if the guaranteed minimum length of delay is long enough, it allows a capable UE to be in a low-power awake mode (e.g., low-power receiver configuration) when receiving the paging indication (e.g., on PDCCH) and to transition to a high-power awake mode (e.g., high-power receiver configuration) when it comes time to receive the corresponding paging message (e.g., on PDSCH). The guaranteed minimum length of delay can be provided in a variety of ways, including the use of cross-slot scheduling (e.g., scheduling the paging message in a subsequent slot from the paging indication (e.g., using non-zero k0 value)) or same-slot scheduling with delay (e.g., scheduling the paging message within the same slot as the paging indication but with a delay (e.g., using non-zero start and length indicator value (SLIV)).

According to some embodiments, the network configures a UE, a group of UEs, or all of the UEs to expect the guaranteed minimum length of delay during paging. While in some embodiments the network explicitly configures the UE to expect the guaranteed minimum length of delay, in other embodiments this does not require explicit configuration (e.g., UEs are configured to expect the guaranteed minimum length of delay by default, that is the only supported mode, etc.).

There are, proposed herein, various embodiments which address one or more of the issues disclosed herein. An embodiment is a method performed by a wireless device in a wireless communication network. The method includes receiving a paging indication from a base station, transitioning to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication, determining, while in the sleep mode, whether the wireless device is to receive a paging message corresponding to the paging indication, and staying in the sleep mode or transitioning into a deeper sleep mode in response to a determination that the wireless device does not need to receive the paging message corresponding to the paging indication. In one embodiment, the paging indication is received during a PO on a PDCCH. In one embodiment, the paging message corresponding to the paging indication is received on a PDSCH. In one embodiment, the guaranteed minimum length of delay is at least a one slot delay. In one embodiment, the guaranteed minimum length of delay is at least a multiple symbol delay within a given slot. In one embodiment, the wireless device is aware that the base station is to apply the guaranteed minimum length of delay during paging based on receiving an indication from the base station that the base station is to apply the guaranteed minimum length of delay during paging. In one embodiment, the method further includes receiving an indication of an actual length of delay that the base station is to apply during paging, wherein the actual length of delay is greater than or equal to the guaranteed minimum length of delay. In one embodiment, the indication that the base station is to apply the guaranteed minimum length of delay during paging is received during a radio resource control (RRC) configuration process or a RRC reconfiguration process. In one embodiment, the method includes transitioning to an awake mode before the paging message corresponding to the paging indication is to be transmitted by the base station in response to a determination that the wireless device is to receive the paging message corresponding to the paging indication and receiving the paging message corresponding to the paging indication. In one embodiment, the wireless device is in a lower-power awake mode when receiving the paging indication and the wireless device transitions to a higher-power awake mode to receive the paging message corresponding to the paging indication.

An embodiment is a method performed by a first base station in a wireless communication network. The method includes transmitting a paging indication to a set of wireless devices and transmitting a paging message corresponding to the paging indication at least with a guaranteed minimum length of delay after transmitting the paging indication, wherein at least one wireless device from the set of wireless devices is aware, prior to the at least one wireless device decoding the paging indication, that the base station is to transmit the paging message corresponding to the paging indication with at least the guaranteed minimum length of delay after the base stations transmits the paging indication, wherein awareness of the guaranteed minimum length of delay allows the at least one wireless device to transition to a sleep mode after receiving the paging indication and before the at least one wireless device decodes the paging indication. In one embodiment, the method further includes informing a second base station in the wireless communication network that the guaranteed minimum length of delay is to be applied during paging of the wireless device. In one embodiment, the second base station is a base station in the same tracking area as the first base station. In one embodiment, the second base station is a base station in a different tracking area from the first base station. In one embodiment, the method further includes transmitting an indication to the wireless device during a RRC configuration process or a RRC reconfiguration process that the base station is to apply the guaranteed minimum length of delay during paging.

Certain embodiments may provide one or more of the following technical advantage(s). The proposed solution provides a mechanism to reduce PO monitoring power consumption, thereby leading to power savings particularly in the RRC_Idle/Inactive modes. This power saving improvement is particularly relevant at the node equipment level (e.g., UE).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Joint GP-RNTI and Cross-Slot Scheduling

Figure 3:
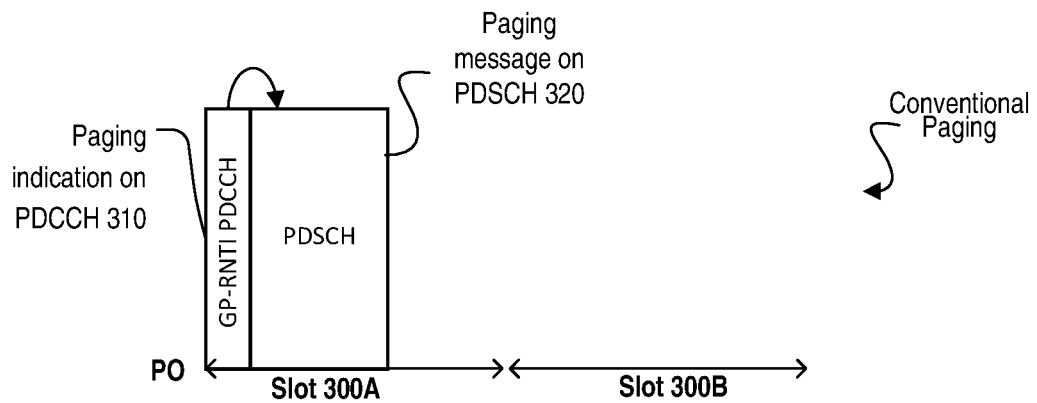
FIG. 3 is a diagram illustrating a conventional approach for paging occasion (PO) monitoring.

FIG. 3 is a diagram illustrating a conventional approach for PO monitoring. In FIG. 3, it is assumed that the UE is configured with a GP-RNTI, an I-DRX configuration if it is in RRC_Inactive (or Idle DRX configuration if it is in RRC_Idle—as used herein both may be generally referred to as "I-DRX"), and POs. The UE becomes awake after each I-DRX cycle to monitor PO (e.g., the PO includes slot 300A and slot 300B, and the UE becomes awake at the start of slot 300A). Assuming a paging indication 310 is transmitted on PDCCH in slot 300A, the UE decodes the paging indication 310 to determine whether the UE's GP-RNTI matches that of the paging indication 310. If the GP-RNTI matches, the UE has to receive and decode the corresponding paging message 320 transmitted in the same slot 300A on PDSCH to see if it includes its UE ID to make sure it is actually being paged.

Figure 4:
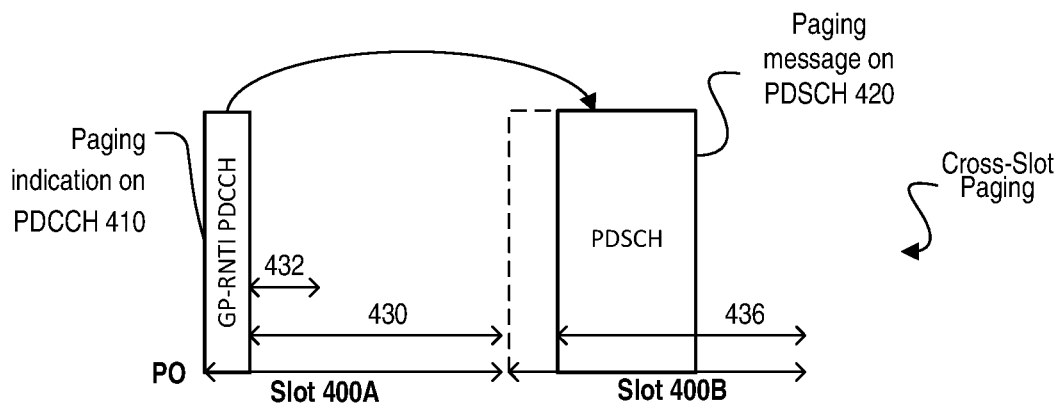
FIG. 4 is a diagram illustrating a cross-slot paging approach, according to some embodiments.

FIG. 4 is a diagram illustrating a cross-slot paging approach, according to some embodiments. In FIG. 4, the network configures (if not configured by default or only cross-slotting for PO monitoring is supported) the UE to expect cross-slot scheduling for PO monitoring. The UE becomes awake after each I-DRX cycle to monitor PDCCH during the PO (e.g., awake at the start of slot 400A). The UE decodes the paging indication 410 transmitted on PDCCH to determine whether the UE's GP-RNTI matches that of the paging indication 410. If the GP-RNTI matches, the UE has to receive and decode the corresponding paging message 420 on PDSCH to determine whether it includes its UE ID to make sure it is actually being paged. Unlike in FIG. 3, in FIG. 4 the corresponding paging message 420 is transmitted and received in the next slot 400B (that is, the transmission and receipt of the corresponding paging message 420 is delayed by at least one slot and this is guaranteed). As such, the UE in some embodiments is implemented to transition to a sleep mode (e.g., light/microsleep) after receiving the paging indication 410 on PDCCH (during the start of the period 430—e.g., for period 432) until it decodes the paging indication 410 on PDCCH and determines whether there is a GP-RNTI match or not. If there is no GP-RNTI match, the UE can transition to a deep sleep mode for another I-DRX cycle (e.g., starting after period 432 and until the next PO). However, if there is a GP-RNTI match, then the UE may transition to an awake mode (e.g., right before the paging message 420 is transmitted on PDSCH) to read the paging message 420 and determine whether it is actually being paged or not. A principal difference of same-slot (conventional) and cross-slot paging with non-zero k0 (e.g. k0=1 (i.e., one slot delay)) can thus be seen from FIGS. 3 and 4. While FIG. 4 illustrates k0=1 (one slot delay), other embodiments can implement k0>1.

In one embodiment, the network informs the UE to expect a guaranteed minimum length of delay between a paging indication and a corresponding paging message (e.g., cross-slot scheduling) without specifying the k0 value. As such the UE knows that at minimum k0=1 and can decide based on its capabilities if it can transition to a sleep mode (e.g., light/microsleep mode) or not. This can be achieved, for example, by removing k0=0 from the list of possible values in the RRC parameter PDSCH-Config. A capable UE can transition to a sleep mode, and after PDCCH decoding become aware that k0=1 (or larger) so it does not have to wake up for PDSCH reception until after one slot (or longer) so it can stay in sleep mode.

In one embodiment, awareness of a guaranteed minimum length of delay (e.g., via cross-slot scheduling) may be used by a UE to adopt a more power-efficient receiver configuration for PDCCH reception, instead of a default configuration used for PDSCH reception. If a minimum k0 value is guaranteed by the network that allows sufficient time for the UE's receiver to be reconfigured, a more power-efficient receiver configuration can be used for PDCCH reception and the less power-efficient PDSCH reception configuration may be activated only upon detecting a matching GP-RNTI.

In one embodiment, the network informs the UE of an explicit minimum k0 value (where k0>0) that is going to be used during paging. In a specific implementation of this embodiment, the network explicitly mentions the actual k0 value (which may be the same or larger than the minimum k0 value) that is going to be used during paging (e.g., by only configuring one integer in PDSCH-Config).

To choose the appropriate k0 value, the network may consult the UE either by requesting the UE to provide this information or the UE could assist the network in setting this value particularly during connection establishment (e.g. as a UE capability report at connection establishment).

The network can decide to configure all UEs (e.g., cell-wide), a group or some groups of UEs, or one or a subset of UEs with the above configurations.

In one embodiment, the network configures the UE for the described procedure during RRC configuration at the time of connection establishment or uses RRCReconfiguration to change the underlying setting (e.g. going back to same-slot, changing k0, etc.). Another approach is to configure/reconfigure the UE in the RRCRelease (e.g., as part of the SuspendConfig or a new line in RRCRelease). Other types of signalings such as L1 signaling may be used as well.

In one embodiment, the guaranteed minimum length of delay (e.g., guarantee of cross-slot scheduling) applies to the UE only in the current cell (e.g. the latest active cell where the UE entered idle/inactive mode). In other embodiments, the guarantee may apply in the current tracking area (TA) or radio access network based notification area (RNA), in which case the base stations (e.g., gNBs) in the area exchange UE ID information for UEs that have been provided the guarantees. In yet other embodiments, the guarantee may apply across multiple areas and the base stations propagate the relevant UE ID information as the UE leaves one area and registers in another area.

In one embodiment, the network may provide information regarding the guaranteed minimum length of delay (e.g., guarantee of cross-slot scheduling) to all UEs for PO monitoring in the cell via system information (SI) (e.g. in remaining minimum system information (RMSI) or other system information (OSI)). In some embodiments, the UE may choose whether to retrieve this configuration information from the SI based on whether the UE design can benefit from light/microsleep and/or receiver configuration switching features.

Figure 5:
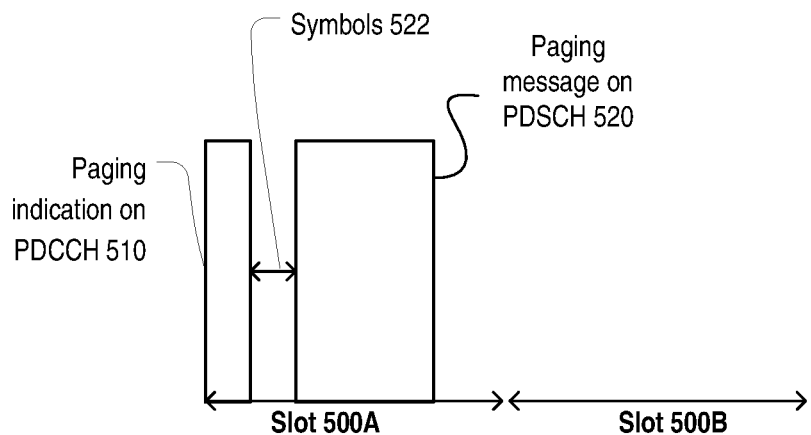
FIG. 5 is a diagram illustrating PO monitoring with same slot scheduling with non-zero start and length indicator value (SLIV), according to some embodiments.

FIG. 5 is a diagram illustrating PO monitoring with same slot scheduling with non-zero SLIV, according to some embodiments. The UE becomes awake after each I-DRX cycle to monitor PO (e.g., the PO includes slot 500A and slot 500B, and the UE becomes awake at the start of slot 500A). In FIG. 5, the network configures the UE to expect a paging message 520 on PDSCH to be transmitted within a number of symbols 522 after the transmission of a paging indication 510 on PDCCH within the same slot (slot 500A). In a similar manner as the cross-slot scheduling approach discussed above, if the UE capabilities allow, the UE can transition to a sleep mode (e.g., light/microsleep) during symbols 522 and either: 1) wake up for the paging message 520 on PDSCH if there is a GP-RNTI match; or 2) stay asleep (or transition to an even deeper sleep mode) until the next PO if there is no GP-RNTI match. Where the UE has such a capability, in one embodiment, it can report it to the network as part of the UE capability report, so the network can use this info to tailor paging transmission to the UE.

While the approach is discussed above in the context where GP-RNTI is used, the approach can also apply and provide power-saving advantages in a context where P-RNTI is used. For example, with existing paging mechanism that use P-RNTI, if k0=0 is possible, then the UE has to stay awake to receive a possible paging message on PDSCH until it finishes decoding the paging indication on PDCCH and determines that it is not being paged (e.g., because there is no P-RNTI match). The approach discussed above would similarly obviate the need for the UE to stay awake after PDCCH reception and thus the UE can transition to a sleep mode after PDCCH reception and transition to an awake mode to receive the corresponding paging message if there was a P-RNTI match. Furthermore, the approached discussed above can also apply to paging in RRC_Connected mode in addition to RRC_Idle/Inactive mode.

Considering that GP-RNTI addresses a group of UEs, it can be considered as a specific case of wake-up-signal. Therefore, in one embodiment, the UE employs a lower power receiver architecture to decode the paging indication on PDCCH and then activates the higher power main receiver for receiving the corresponding paging message on PDSCH. This can become more power efficient if the UEs have individual P-RNTIs, which is a more specific version of GP-RNTI (e.g., the smaller the set of UEs having the same GP-RNTI, the fewer UEs end up detecting a paging indication on PDCCH that is relevant to them and thus fewer UEs have to perform PDSCH processing). The network may use GP-RNTI granularity to cover one, a few, or many UEs in each GP-RNTI, based on paging transmission overhead. Individual GP-RNTIs may not allow aggregating multiple pages into a single PDCCH/PDSCH transmission. Furthermore, in some embodiments, considering that the UE has to also wake up for synchronization signal block (SSB) measurements, the wake up signaling (WUS) consideration of GP-RNTI can become more efficient if SSB measurements are also close to POs (e.g., UE needs to measure SSB for radio resource management (RRM) and/or for synchronization, and it cannot go to deep sleep between the SSB measurement and the PO (otherwise the synchronization is lost) so the shorter the gap, the shorter the time the UE is out of deep sleep).

In one embodiment, the network configures the UE with a different bandwidth part (BWP) for PO PDCCH monitoring than the one for PDSCH (e.g., a smaller BWP can be used for PDCCH with respect to PDSCH to save additional power). Further, the UE may go back to the default BWP (i.e., the smaller BWP) for PO monitoring if it turns out that it has not been paged.

In one embodiment, the network configures the UE to monitor PO PDCCH using a different number of antennas than used for PDSCH (e.g., a lower number to save power considering that paging is a single layer transmission). In one embodiment, the UE itself can decide to turn off a number of antennas (e.g., if SSB measurement results indicate good channel conditions to save power) or turn on additional antennas if channel conditions have weakened.

In one embodiment, the network provides the cross-slot paging option to UEs that need it without incurring additional PDSCH overhead by configuring multiple GP-RNTI (or P-RNTI) on PDCCHs to point to the same paging message on PDSCH (e.g., by using different k0 values in different PDCCHs (e.g., 3, 2, 1) so that they all point to the same slot for PDSCH). The paging message on that PDSCH may then contain paging records for all paged UEs from the multiple POs ((G)P-RNTI PDCCHs).

When a paging storm happens, the coexistence of GP-RNTI configured UEs and P-RNTI configured UEs becomes important, particularly since paging indication on PDCCH is typically transmitted with a high aggregation level (AL) to support large coverage. As such the network resources may become limited. To solve this problem, in one embodiment, the network configures different CORESETs and/or search spaces for P-RNTI and GP-RNTI UEs within which the UEs have to look for paging indication on PDCCH. In one example, the network may distribute the CORESETs in time (e.g., the first symbol of a slot is related to P-RNTI and the second GP-RNTIs (or a subset of GP-RNTIs) and so on) or transmit them in different frequency components, depending on the network configuration/preferences. In such an embodiment, the network may reconfigure the UEs to a common default CORESET for paging monitoring when the paging storm has ended.

Figure 6:
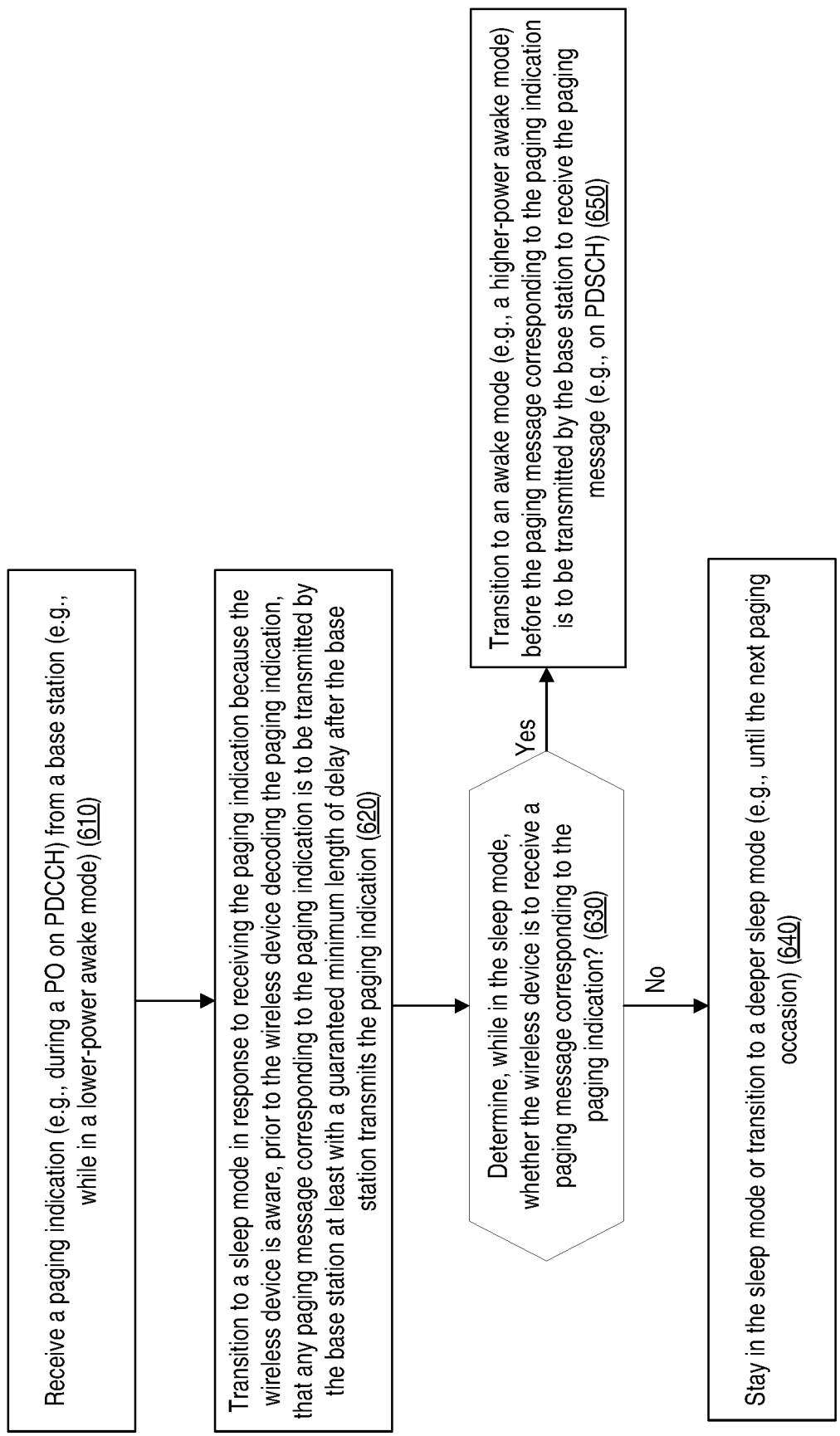
FIG. 6 is a flow diagram of a method for providing reduced PO monitoring power consumption, according to some embodiments.

FIG. 6 is a flow diagram of a method for providing reduced PO monitoring power consumption, according to some embodiments. In an embodiment, the method is performed by a wireless device (e.g., a UE) in a wireless communication network. The method includes step 610 in which a wireless device receives a paging indication from a base station. The paging indication may indicate to the wireless device whether there is a corresponding paging message that the wireless device is to receive/decode (e.g., based on matching P-RNTI GP-RNTI). In one embodiment, the paging indication is received during a paging occasion on PDCCH. In one embodiment, the wireless device receives the paging indication while in a lower-power awake mode. The method further includes step 620 in which the wireless device transitions to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication. The method further includes decision step 630 in which the wireless device determines, while in the sleep mode, whether the wireless device is to receive a paging message corresponding to the paging indication. In one embodiment, this determination is based on whether the UE's P-RNTI or GP-RNTI matches that of the paging indication. If the wireless device determines that is it is not to receive the paging message corresponding to the paging indication (e.g., because there is no P-RNTI or GP-RNTI match), in step 640, the wireless device stays in the sleep mode or transitions to a deeper sleep mode (e.g., until the next paging occasion). However, if the wireless device determines that it is to receive the paging message corresponding to the paging indication (e.g., because there is a P-RNTI or GP-RNTI match), in step 650, the wireless device transitions to an awake mode before the paging message corresponding to the paging indication is to be transmitted by the base station to receive the paging message. In one embodiment, this awake mode is a higher-power awake mode (relative to the awake mode that the wireless device was in when receiving the paging indication). In one embodiment, the wireless device may inspect the contents of the paging message to determine whether it is being paged (e.g., the wireless device may check whether the UE's ID (e.g., I-RNTI or 5G-S-TMSI) is included in the paging message).

Figure 7:
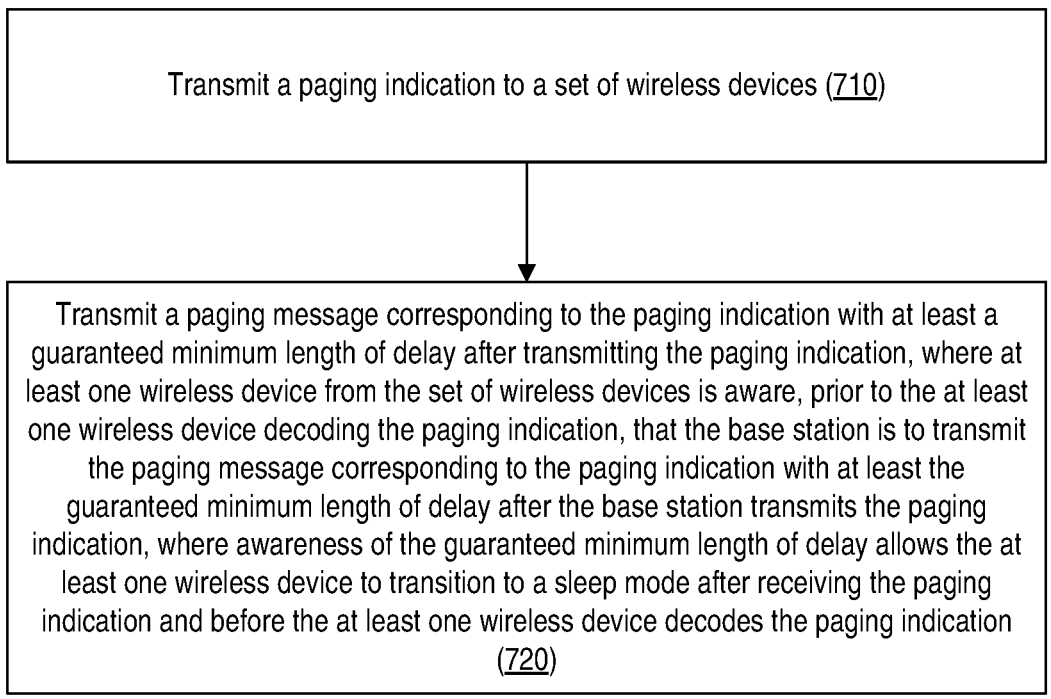
FIG. 7 is a flow diagram of a method for providing reduced PO monitoring power consumption, according to some embodiments.

FIG. 7 is a flow diagram of a method for providing reduced PO monitoring power consumption, according to some embodiments. In an embodiment, the method is performed by a base station (e.g., a gNB) in a wireless communication network. The method includes step 710 in which the base station transmits a paging indication to a set of wireless devices. In one embodiment, the paging indication includes or otherwise indicates a P-RNTI or a GP-RNTI. The method further includes step 720 in which the base station transmits a paging message corresponding to the paging indication with at least a guaranteed minimum length of delay after transmitting the paging indication, where at least one wireless device from the set of wireless devices is aware, prior to the at least one wireless device decoding the paging indication, that the base station is to transmit the paging message corresponding to the paging indication with at least the guaranteed minimum length of delay after the base station transmits the paging indication, where awareness of the guaranteed minimum length of delay allows the at least one wireless device to transition to a sleep mode after receiving the paging indication and before the at least one wireless device decodes the paging indication.

Figure 8:
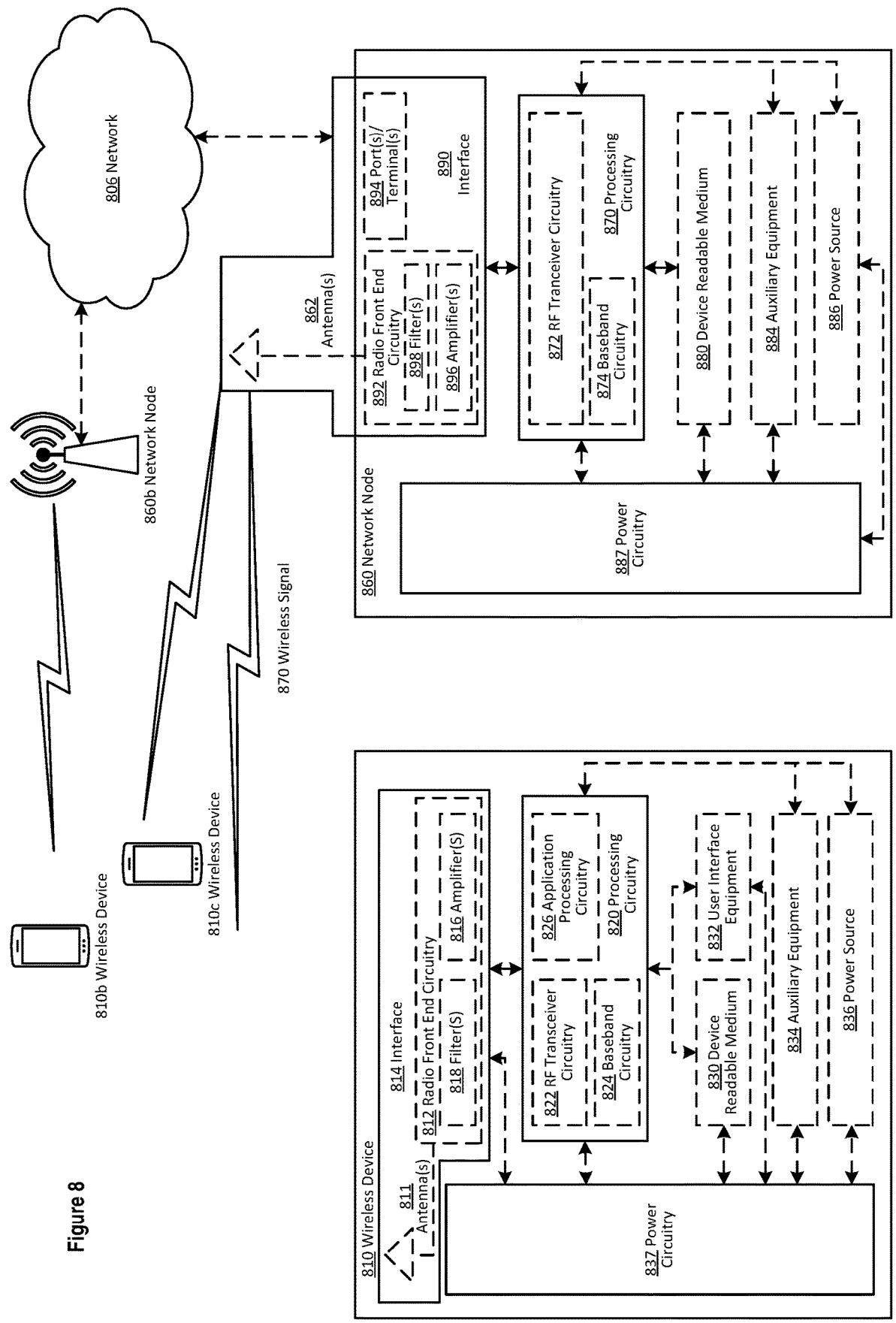
FIG. 8 is a diagram of a wireless network, according to some embodiments.

FIG. 8: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and wireless devices (WDs) 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the Institute of Electrical and Electronics Engineers (IEEE) 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., mobile switching centers (MSCs), mobility management entities (MMEs)), operation and maintenance (O&M) nodes, operation and support system (OSS) nodes, self-organizing network (SON) nodes, positioning nodes (e.g., enhanced serving mobile location center (E-SMLCs)), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, Wideband Code Division Multiple Access (WCDMA), LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send/transmit and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send/transmit and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
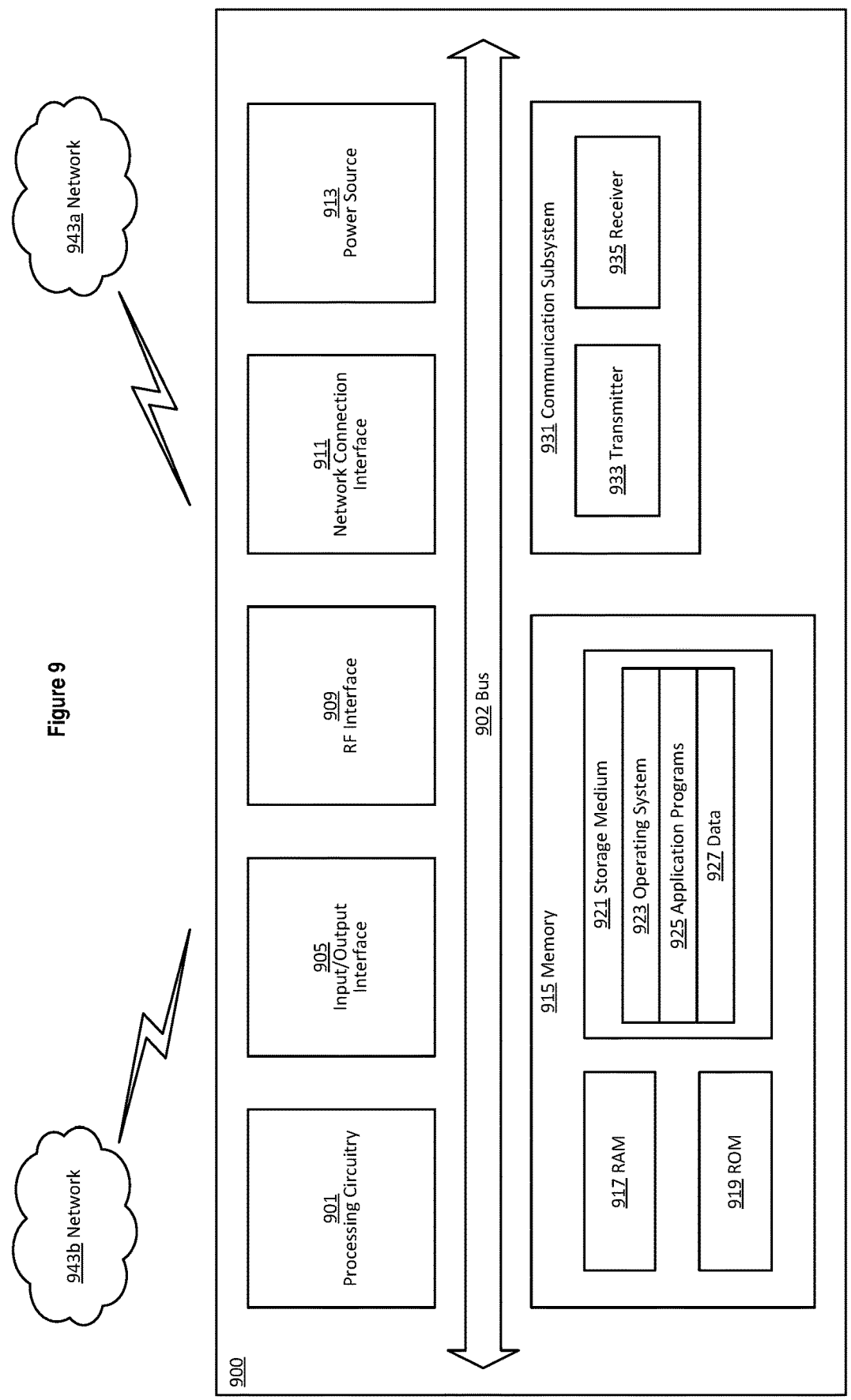
FIG. 9 is a diagram of a User Equipment, according to some embodiments.

FIG. 9: User Equipment in Accordance with Some Embodiments

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UMTS Terrestrial Radio Access Network (UTRAN), WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
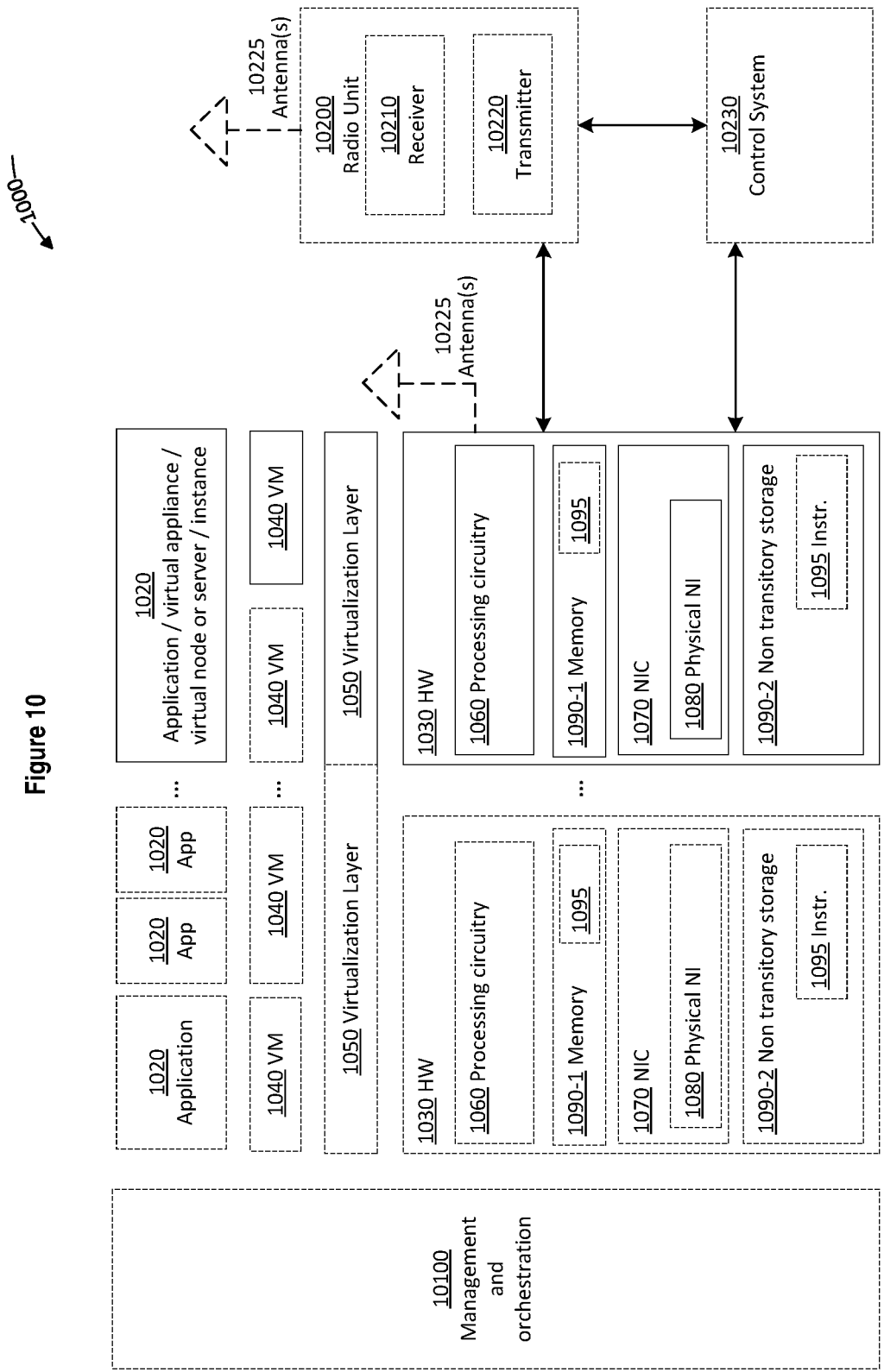
FIG. 10 is a diagram of a virtualization environment, according to some embodiments.

FIG. 10: Virtualization Environment in Accordance with Some Embodiments

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Figure 11:
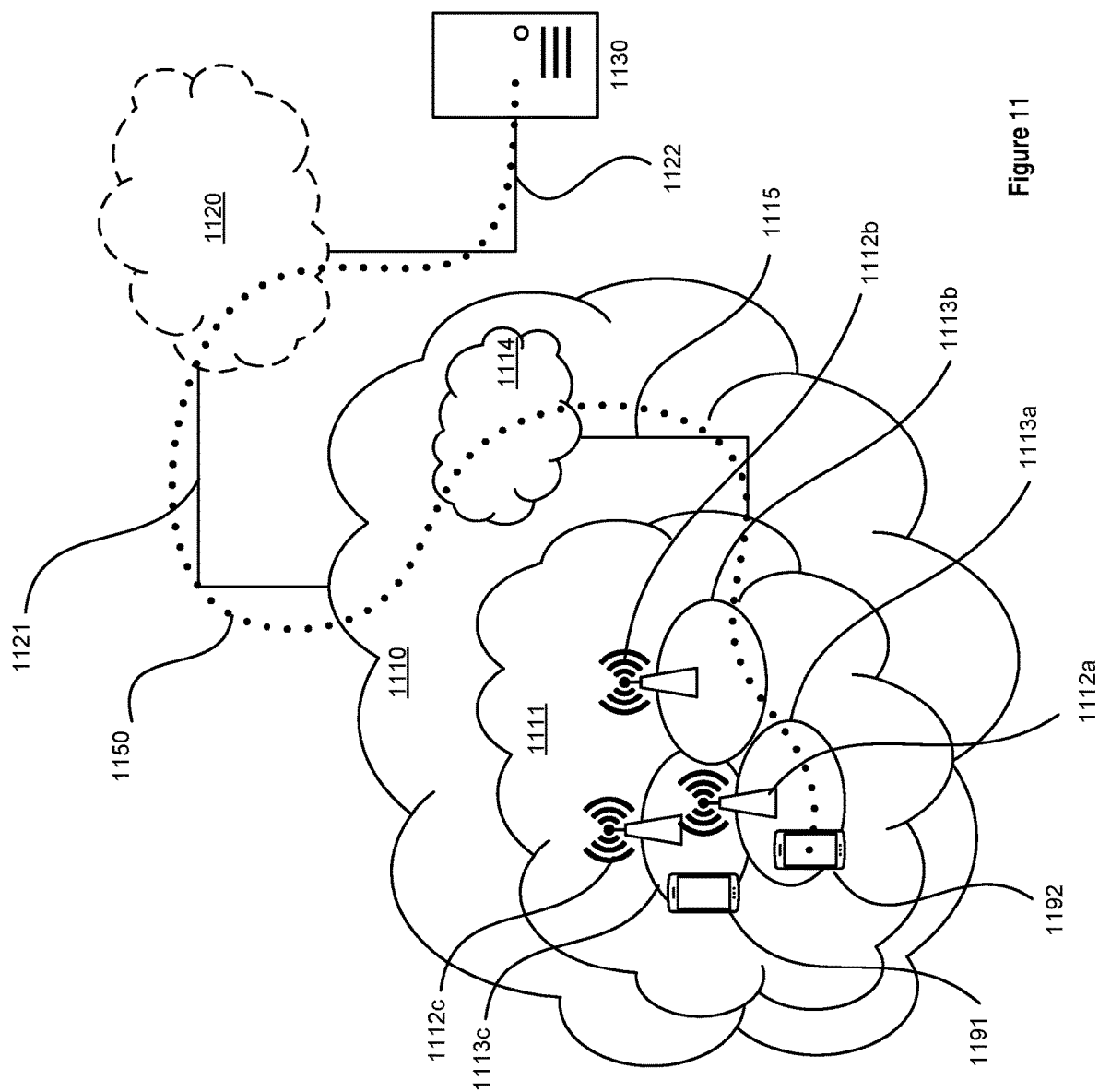
FIG. 11 is a diagram of a telecommunication network connected via an intermediate network to a host computer, according to some embodiments.

FIG. 11: Telecommunication Network Connected Via an Intermediate Network to a Host Computer in Accordance with Some Embodiments With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
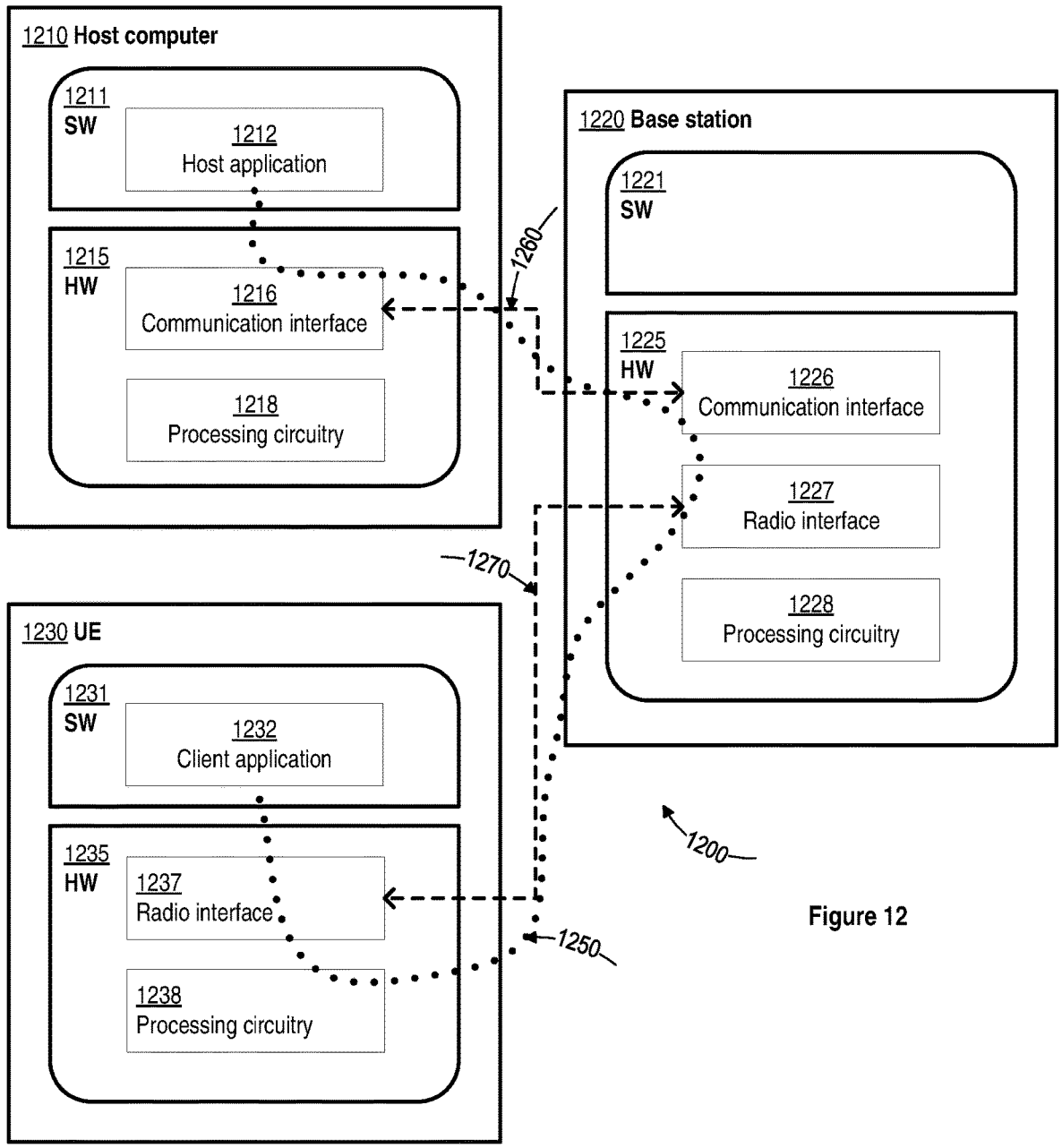
FIG. 12 is a diagram of a host computer communicating via a base station with a user equipment over a partially wireless connection, according to some embodiments.

FIG. 12: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may reduce the amount of power consumed by UE 1230 for paging occasion monitoring and thereby provide benefits such as extended battery lifetime of UE 1230.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

FIG. 13: Methods Implemented in a Communication System Including a Host Computer, a Base Station and a User Equipment in Accordance with Some Embodiments FIG. 13 is a flow diagram illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14: Methods Implemented in a Communication System Including a Host Computer, a Base Station and a User Equipment in Accordance with Some Embodiments FIG. 14 is a flow diagram illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
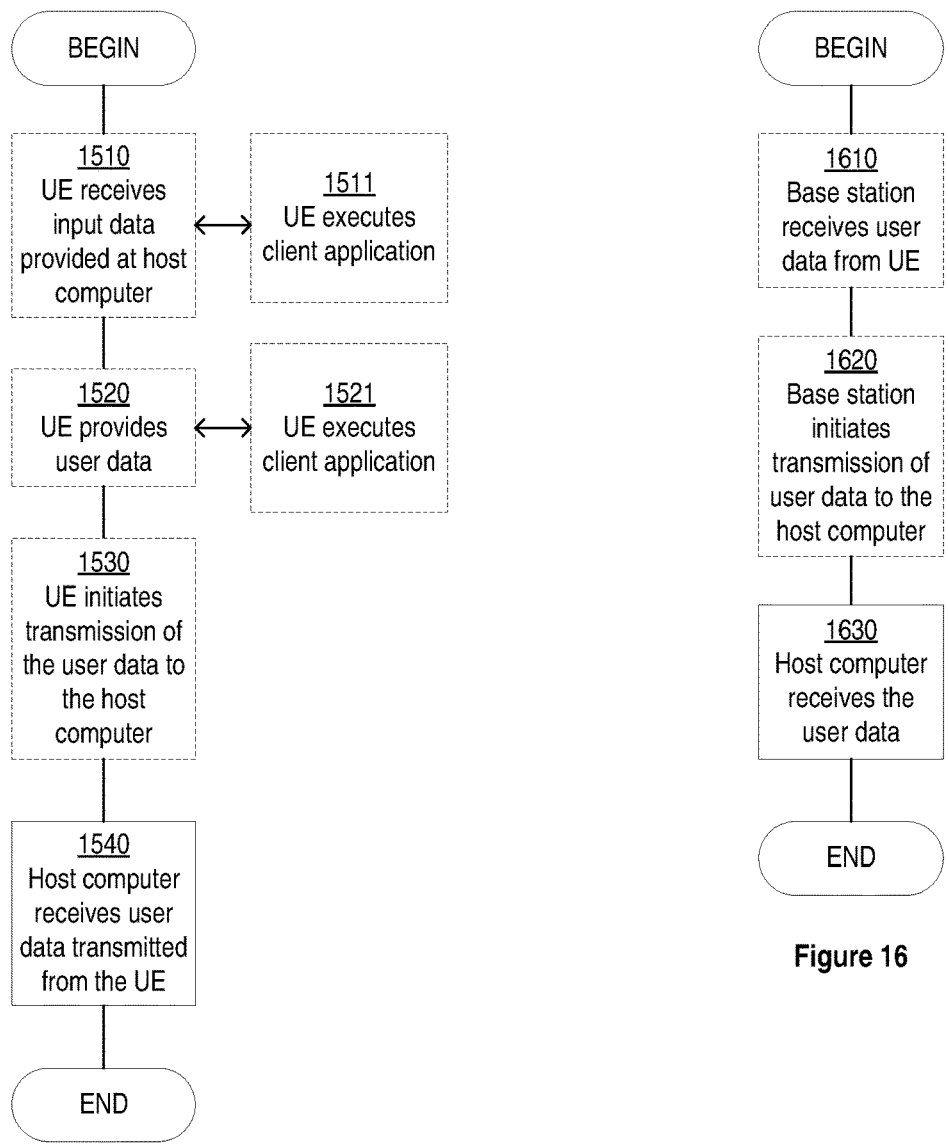
FIG. 15 is a flow diagram of methods implemented in a communication system including a host computer, a base station and a user equipment, according to some embodiments.

FIG. 15: Methods Implemented in a Communication System Including a Host Computer, a Base Station and a User Equipment in Accordance with Some Embodiments FIG. 15 is a flow diagram illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16: Methods Implemented in a Communication System Including a Host Computer, a Base Station and a User Equipment in Accordance with Some Embodiments FIG. 16 is a flow diagram illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Figure 17:
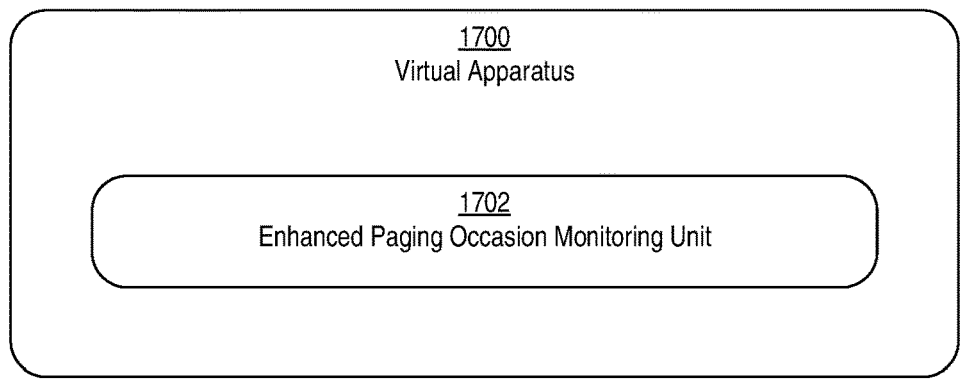
FIG. 17 is a diagram of a virtualization apparatus, according to some embodiments.

FIG. 17: Virtualization Apparatus in Accordance with Some Embodiments

FIG. 17 illustrates a schematic block diagram of an apparatus 1700 in a wireless network (for example, the wireless network shown in FIG. 8). The apparatus may be implemented in a wireless device or network node (e.g., wireless device 810 or network node 860 shown in FIG. 8). Apparatus 1700 is operable to carry out the example method described with reference to FIG. 6 (e.g., when the apparatus 1700 is implemented in a wireless device) or FIG. 7 (e.g., when the apparatus 1700 is implemented in a network node), and possibly any other processes or methods disclosed herein. It is also to be understood that the method of FIG. 6 or 7 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause enhanced paging occasion monitoring unit 1702 and any other suitable units of apparatus 1700 to perform corresponding functions according one or more embodiments of the present disclosure.

As illustrated in FIG. 17, apparatus 1700 includes enhanced paging occasion monitoring unit 1702. In an embodiment (e.g., where the apparatus 1700 is implemented in a wireless device), enhanced paging occasion monitoring unit 1702 is configured to cause the wireless device to transition to a sleep mode in response to the wireless device receiving a paging indication (e.g., while in a lower-power awake mode) from a base station because the wireless device is aware, prior to the wireless device decoding the paging indication, that any paging message corresponding to the paging indication is to be transmitted by the base station at least with a guaranteed minimum length of delay after the base station transmits the paging indication. The enhanced paging occasion monitoring unit 1702 may further be configured to determine, while the wireless device is in sleep mode, whether the wireless device is to receive a paging message corresponding to the paging indication. The enhanced paging occasion monitoring unit 1702 may further be configured to cause the wireless device to stay in the sleep mode or transition to a deeper sleep mode responsive to a determination that the wireless device is not to receive the paging message corresponding to the paging indication. The enhanced paging occasion monitoring unit 1702 may further be configured to cause the wireless device to transition to an awake mode (e.g., higher-power awake mode) before the paging message corresponding to the paging indication is to be transmitted by the base station (to receive the paging message) in response to a determination that the wireless device is to receive the paging message corresponding to the paging indication.

In an embodiment (e.g., where the apparatus 1700 is implemented in a network node), enhanced paging occasion monitoring unit 1702 is configured to cause the network node to transmit a paging indication to a set of wireless devices. The enhanced paging occasion monitoring unit 1702 is further configured to cause the network node to transmit a paging message corresponding to the paging indication with at least a guaranteed minimum length of delay after transmitting the paging indication, where at least one wireless device from the set of wireless devices is aware, prior to the at least one wireless device decoding the paging indication, that the base station is to transmit the paging message corresponding to the paging indication with at least the guaranteed minimum length of delay after the base station transmits the paging indication, where awareness of the guaranteed minimum length of delay allows the at least one wireless device to transition to a sleep mode after receiving the paging indication and before the at least one wireless device decodes the paging indication.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a wireless device in a wireless communication network for reducing paging occasion monitoring power consumption, the method comprising:
   receiving a paging indication from a base station;
   transitioning to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication;
   determining, while in the sleep mode, whether the wireless device is to receive a paging message corresponding to the paging indication; and
   staying in the sleep mode or transitioning into a deeper sleep mode in response to a determination that the wireless device does not need to receive the paging message corresponding to the paging indication.

2. The method of claim 1, wherein the paging indication is received on a Physical Downlink Control Channel, PDCCH.

3. The method of claim 2, wherein the paging message corresponding to the paging indication is received on a Physical Downlink Shared Channel, PDSCH.

4. The method of claim 1, wherein the guaranteed minimum length of delay is at least a one slot delay.

5. The method of claim 1, wherein the guaranteed minimum length of delay is at least a multiple symbol delay within a given slot.

6. The method of claim 1, wherein the wireless device is aware that the base station is to apply the guaranteed minimum length of delay during paging based on receiving an indication from the base station that the base station is to apply the guaranteed minimum length of delay during paging.

7. The method of claim 6, further comprising:
   receiving an indication of an actual length of delay that the base station is to apply during paging, wherein the actual length of delay is greater than or equal to the guaranteed minimum length of delay.

8. The method of claim 6, wherein the indication that the base station is to apply the guaranteed minimum length of delay during paging is received during a radio resource control, RRC, configuration process, a RRC reconfiguration process, or a RRC release process.

9. The method of claim 6, wherein the indication that the base station is to apply the guaranteed minimum length of delay during paging is received in system information, SI.

10. The method of claim 1, further comprising:
transitioning to an awake mode before the paging message corresponding to the paging indication is to be transmitted by the base station in response to a determination that the wireless device is to receive the paging message corresponding to the paging indication; and
receiving the paging message corresponding to the paging indication.

11. The method of claim 10, wherein the wireless device is in a lower-power awake mode when receiving the paging indication and the wireless device transitions to a higher-power awake mode to receive the paging message corresponding to the paging indication.

12. The method of claim 1, wherein the guaranteed minimum length of delay is determined based on information provided by the wireless device to the base station.

13. The method of claim 1, wherein the guaranteed minimum length of delay applies to the wireless device as the wireless device moves across different tracking areas in the wireless communication network.

14. A method performed by a first base station in a wireless communication network for reducing paging occasion monitoring power consumption, the method comprising:
transmitting a paging indication to a set of wireless devices; and
transmitting a paging message corresponding to the paging indication at least with a guaranteed minimum length of delay after transmitting the paging indication, wherein at least one wireless device from the set of wireless devices is aware, prior to the at least one wireless device decoding the paging indication, that the base station is to transmit the paging message corresponding to the paging indication with at least the guaranteed minimum length of delay after the first base stations transmits the paging indication, wherein awareness of the guaranteed minimum length of delay allows the at least one wireless device to transition to a sleep mode after receiving the paging indication and before the at least one wireless device decodes the paging indication.

15. The method of claim 14, further comprising:
informing a second base station in the wireless communication network that the guaranteed minimum length of delay is to be applied during paging of the at least one wireless device.

16. The method of claim 15, wherein the second base station is a base station in the same tracking area as the first base station.

17. The method of claim 15, wherein the second base station is a base station in a different tracking area from the first base station.

18. The method of claim 14, further comprising:
transmitting an indication to the at least one wireless device during a RRC configuration process, a RRC reconfiguration process, or a RRC release process that the base station is to apply the guaranteed minimum length of delay during paging.

19. The method of claim 14, further comprising:
transmitting, via system information, an indication to all wireless devices within a cell that the base station is to apply the guaranteed minimum length of delay during paging.

20. The method of claim 14, wherein the guaranteed minimum length of delay is determined based on information provided to the base station by one or more wireless devices.

21. A wireless device for providing reduced paging occasion monitoring power consumption in a wireless communication network, the wireless device comprising:
an antenna configured to transmit and receive wireless signals; and
processing circuitry coupled to the antenna, wherein the processing circuitry is configured to cause the wireless device to:
receive, via the antenna, a paging indication from a base station,
transition to a sleep mode in response to receiving the paging indication because the wireless device is aware, prior to the wireless device decoding the paging indication, that any paging message corresponding to the paging indication is to be transmitted by the base station at least with a guaranteed minimum length of delay after the base station transmits the paging indication,
determine, while in the sleep mode, whether the wireless device is to receive a paging message corresponding to the paging indication, and
stay in the sleep mode or transition into a deeper sleep mode in response to a determination that the wireless device does not need to receive the paging message corresponding to the paging indication.

22. The wireless device of claim 21, wherein the paging indication is received on a Physical Downlink Control Channel, PDCCH, and the paging message corresponding to the paging indication is received on a Physical Downlink Shared Channel, PDSCH.

23. The wireless device of claim 21, wherein the guaranteed minimum length of delay is at least a one slot delay.

24. A network device configured to function as a first base station in a wireless communication network to provide reduced paging occasion monitoring power consumption in the wireless communication network, the network device comprising:
an antenna configured to transmit and receive wireless signals; and
processing circuitry coupled to the antenna, wherein the processing circuitry is configured to cause the network device functioning as the first base station to:
transmit, via the antenna, a paging indication to a set of wireless devices and
transmit, via the antenna, a paging message corresponding to the paging indication at least with a guaranteed minimum length of delay after transmitting the paging indication, wherein at least one wireless device from the set of wireless devices is aware, prior to the at least one wireless device decoding the paging indication, that the first base station is to transmit the paging message corresponding to the paging indication with at least the guaranteed minimum length of delay after the base stations transmits the paging indication, wherein awareness of the guaranteed minimum length of delay allows the at least one wireless device to transition to a sleep mode after receiving the paging indication and before the at least one wireless device decodes the paging indication.

25. The network device of claim 24, wherein the processing circuitry is further configured to cause the network device functioning as the first base station to:
inform a second base station in the wireless communication network that the guaranteed minimum length of delay is to be applied during paging of the at least one wireless device.

* * * * *